US011796325B2

(12) United States Patent
Malson et al.

(10) Patent No.: US 11,796,325 B2
(45) Date of Patent: Oct. 24, 2023

(54) VEHICLE LOCALIZATION USING MAP AND VISION DATA

(71) Applicant: Aptiv Technologies Limited, St. Michael (BB)

(72) Inventors: Steven G. Malson, Metamora, MI (US); James Nicholas Nickolaou, Clarkston, MI (US)

(73) Assignee: Aptiv Technologies Limited, St. Michael (BB)

( * ) Notice: Subject to any disclaimer, the term of this patent is extended or adjusted under 35 U.S.C. 154(b) by 64 days.

(21) Appl. No.: 17/660,516

(22) Filed: Apr. 25, 2022

(65) Prior Publication Data

US 2023/0258458 A1 Aug. 17, 2023

Related U.S. Application Data

(60) Provisional application No. 63/268,118, filed on Feb. 16, 2022.

(51) Int. Cl.
*G01C 21/32* (2006.01)
*G01C 21/00* (2006.01)
*G01C 21/36* (2006.01)
*G01S 19/06* (2010.01)

(52) U.S. Cl.
CPC ......... *G01C 21/32* (2013.01); *G01C 21/3658* (2013.01); *G01C 21/3837* (2020.08); *G01S 19/06* (2013.01)

(58) Field of Classification Search
CPC ............... G01C 21/32; G01C 21/3658; G01C 21/3837; G01S 19/06

USPC ......................................................... 701/533
See application file for complete search history.

(56) References Cited

U.S. PATENT DOCUMENTS

2019/0138824 A1 5/2019 Schack et al.
2020/0218905 A1 7/2020 Wang et al.
2020/0355506 A1* 11/2020 Muto ....................... G06T 7/74
(Continued)

OTHER PUBLICATIONS

Flade, et al., "Vision-Enhanced Low-Cost Localization in Crowdsourced Maps", IEEE Intelligent Transportation Systems Magazine, vol. 12, Issue: 3, 2020, 12 pages.
(Continued)

*Primary Examiner* — Isaac G Smith
(74) *Attorney, Agent, or Firm* — Sawtooth Patent Group PLLC

(57) ABSTRACT

This document describes vehicle localization using map and vision data. For example, this document describes a localization system that obtains a map centerline point and a vision centerline point of a lane of a roadway. The localization system also obtains the position of the vehicle. The localization system can then compare the map centerline point and the vision centerline point to generate a lateral and a longitudinal correction relative to the vehicle's position. The lateral and longitudinal corrections are used to generate a corrected position. In this way, the described localization system can provide accurate vehicle localization that addresses potential drift caused by lapsed or inaccurate positioning data and allows for the operation of assisted-driving and autonomous-driving systems at higher speeds and on roadways with tighter curves.

20 Claims, 8 Drawing Sheets

(56) References Cited

U.S. PATENT DOCUMENTS

2022/0001872 A1    1/2022  Taieb et al.
2023/0063809 A1*   3/2023  Wei .................... G01C 21/3815

OTHER PUBLICATIONS

"Extended European Search Report", EP Application No. 23154303.4, dated Jul. 17, 2023, 8 pages.

* cited by examiner

US 11,796,325 B2

VEHICLE LOCALIZATION USING MAP AND VISION DATA

CROSS-REFERENCE TO RELATED APPLICATION

This application claims the benefit of U.S. Provisional Patent Application No. 63/268,118, filed Feb. 16, 2022, which is incorporated by reference herein in its entirety.

BACKGROUND

Assisted-driving and autonomous-driving systems use map data to perform various Advanced Driver Assistance Systems (ADAS) functionalities (e.g., route planning, lane centering, automatic lane changing, autonomous driving). These functionalities require an accurate vehicle position (e.g., plus or minus ten centimeters) to satisfy performance and safety requirements. Under ideal conditions, satellite-based positioning (e.g., via Global Positioning Systems (GPS) or Global Navigation Satellite Systems (GNSS)) can achieve the necessary accuracy. However, in non-ideal conditions (e.g., when a line of sight to satellites is not possible), satellite-based positioning is unable to provide the necessary accuracy. Consequently, drift in the vehicle position may occur (e.g., up to two-meter error) which negatively affects ADAS systems.

SUMMARY

This document describes techniques, apparatuses, and systems for vehicle localization using map and vision data. For example, this document describes a localization system that can obtain a map centerline point and vision centerline point of a lane of a roadway in which a vehicle is traveling. The localization system can also obtain the position of the vehicle using positioning data. The localization system can then compare the map centerline point and the vision centerline point to generate a lateral correction and longitudinal correction relative to the vehicle's position. The lateral and longitudinal corrections are used to generate a corrected position. The vehicle can then be operated in the roadway based on the corrected position. In this way, the described localization system can provide accurate vehicle localization that addresses potential drift caused by lapses in or inaccurate positioning data. The corrected vehicle localization using map and vision data allows the operation of assisted-driving and autonomous-driving systems at higher speeds and on roadways with tighter curves.

This document also describes other operations of the above-summarized systems, techniques, apparatuses, and other methods set forth herein, as well as means for performing these methods.

This Summary introduces simplified concepts for vehicle localization using map and vision data, further described below in the Detailed Description and Drawings. This Summary is not intended to identify essential features of the claimed subject matter, nor is it intended to determine the scope of the claimed subject matter.

BRIEF DESCRIPTION OF THE DRAWINGS

Details of one or more aspects of vehicle localization using map and vision data are described in this document regarding the following figures. The same numbers are used throughout the drawings to reference like features and components.

DETAILED DESCRIPTION

Overview

Vehicle localization is an important aspect of assisted-driving and autonomous-driving systems. Assisted-driving and autonomous-driving systems can provide route planning, lane centering, automatic lane changing, and autonomous driving functionalities. These functionalities, however, require accurate localization of the host vehicle to satisfy performance and safety requirements. Positioning with satellite-based systems (e.g., GPS, GNSS) can achieve the necessary accuracy under ideal conditions. Such systems do not provide the required accuracy in all environments (e.g., blocked line of sight to satellites from overpasses or skyscrapers). In such situations, estimates of the vehicle's position drift (e.g., up to two-meter errors), which result in unacceptable accuracy for many ADAS functionalities.

Some vehicle-based systems fuse map data and vision data to correct vehicle localization. These systems often use complex algorithms (e.g., simultaneous localization and mapping (SLAM), Kalman filters, 3D image processing) to correlate map data with vision data. Other systems use blending cubic formulas to link map data to vision data which requires significant computational overhead that is generally unavailable in vehicles.

In contrast, this document describes computationally efficient vehicle localization using map and vision data. For example, this document discloses a localization system that obtains a map centerline point and vision centerline point of a roadway lane. The localization system also determines the position of the vehicle using positioning data. The localization system can then compare the map centerline point and the vision centerline point to generate a lateral and longitudinal correction relative to the vehicle's position. The lateral and longitudinal corrections are applied to the vehicle's position to generate a corrected position. The described system can provide accurate vehicle localization that addresses potential drift caused by lapses in or insufficient data from positioning systems. This improved vehicle localization allows the operation of assisted-driving and autonomous-driving systems at higher speeds and on roadways with tighter curves.

This section describes just one example of how the described techniques and systems can perform vehicle localization using map and vision data. This document describes other examples and implementations.

Operating Environment

Figure 1:
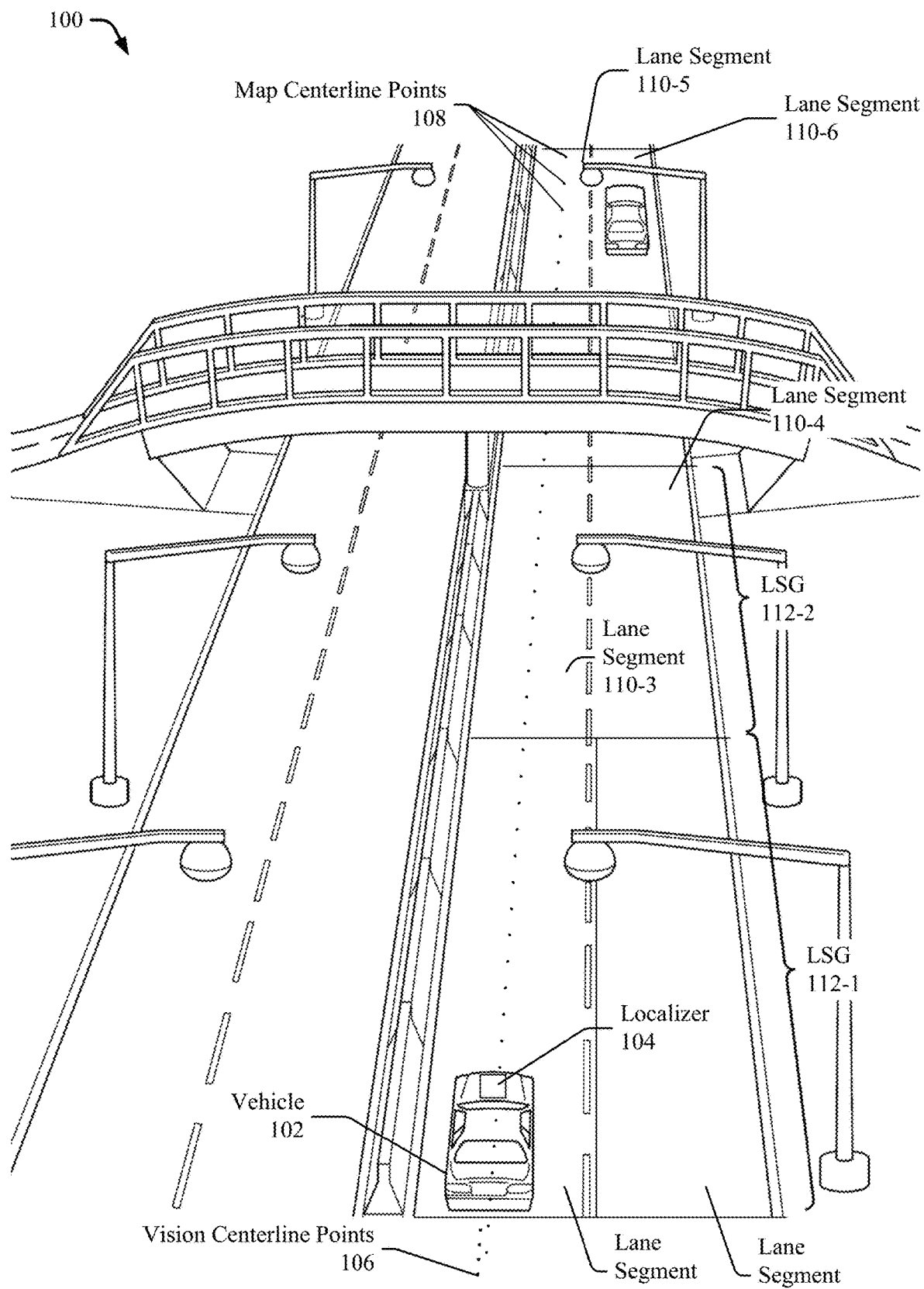
FIG. 1 illustrates an example road environment in which a localizer can perform vehicle localization using map and vision data according to techniques described in this disclosure.

FIG. 1 illustrates an example road environment 100 in which a localizer 104 can perform vehicle localization using map and vision data according to techniques described in this disclosure. FIG. 1 illustrates the localizer 104 as part of a system (not shown) implemented within a vehicle 102. Although presented as a car, vehicle 102 can represent other motorized vehicles (e.g., a motorcycle, a bus, a tractor, a semi-trailer truck, or construction equipment). In general, manufacturers can mount or install the localizer 104 in any moving platform traveling on the roadway.

Vehicle 102 is traveling along a roadway. Although presented as a road (e.g., a highway) with lanes and lane markers in FIG. 1, the roadway can be any type of designated travel routes for a vehicle, including, for example, virtual water lanes used by ships and ferries, virtual air lanes used by unmanned aerial vehicles (UAVs) and other aircraft, train tracks, tunnels, or virtual underwater lanes.

The localizer 104 obtains vision centerline points 106 and map centerline points 108 associated with the roadway. The array of vision centerline points 106 represents the lateral center of the respective lane as determined by one or more vision sensors (e.g., cameras). The array of map centerline points 108 represents the lateral center of the respective lane as stored in a map database (e.g., a high-definition (HD) map database). The map centerline points 108 can include respective geographic locations (e.g., latitude and longitude coordinates) provided in sequence according to the desired direction of vehicle travel on sections of the roadway. Each vision centerline point 106 and map centerline point 108 can include latitude and longitude coordinates in a map coordinate system.

The roadway includes one or more lanes, with the lanes represented by the vision centerline points 106, the map centerline points 108, lane segments 110, and lane segment groups (LSGs) 112. The lane segments 110 represent respective portions of a roadway lane. For example, the lane segments 110-1, 110-3, and 110-5 represent respective portions of the current lane in which vehicle 102 is traveling. One or more lane segments 110 with the same travel direction are included in an LSG 112. The LSGs 112 are generally respective portions of a group of lanes in the same travel direction that do not split with unchanging lane markers. For example, the LSG 112-1 includes the lane segments 110-1 and 110-2. The LSG 112-2 includes the lane segments 110-3 and 110-4. The LSG 112-3 includes the lane segments 110-5 and 110-6. Each of the LSGs 112 may include a plurality of lines (e.g., vectors of points, lane markers). In some implementations, each of the LSGs 112 may include a predetermined origin. The origins can be centered laterally in the respective LSGs 112 and at the beginning of each LSG 112. The locations of the origins relative to the respective LSGs 112 may vary without departing from the scope of this disclosure.

In the depicted environment 100, one or more sensors (not illustrated) are mounted to or integrated within the vehicle 102. The sensors can include vision sensors (e.g., cameras) and position sensors that provide vision data and position data, respectively, to the localizer 104. The position sensors can include GPS and/or GNSS systems or inertial measurement units (IMUs). The localizer 104 can also obtain map data stored locally or remotely in a map database. The localizer 104 uses the map data and vision data to provide accurate vehicle positioning to assisted-driving and autonomous-driving systems of the vehicle 102 (e.g., for lane centering or autonomous driving). For example, the localizer can obtain the vision centerline points 106 and the map centerline points 108 for the roadway on which the vehicle 102 is traveling. The localizer 104 compares the vision centerline points 106 and the map centerline points 108 to generate lateral and longitudinal corrections relative to the position of the vehicle 102, which is obtained based on positioning data. The localizer 104 applies the lateral and longitudinal corrections to the vehicle's position to generate a corrected position of the vehicle. In this way, the localizer 104 uses map and vision data to provide more accurate vehicle positioning, allowing assisted-driving and autonomous-driving systems to avoid drift in positioning systems and smoothly operate curved roadways at higher speeds.

Example Architecture

Figure 2:
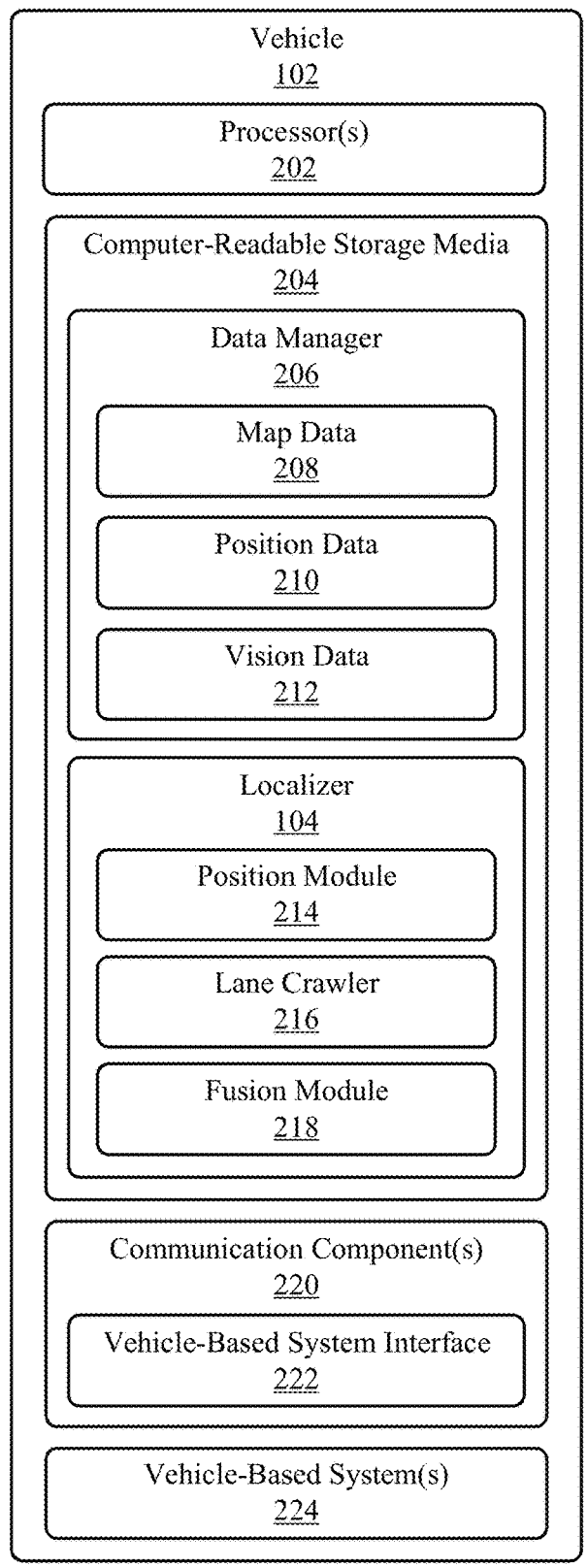
FIG. 2 illustrates vehicle software components utilized to perform vehicle localization using map and vision data according to techniques described in this disclosure.

FIG. 2 illustrates vehicle software components utilized to perform vehicle localization using map and vision data according to techniques described in this disclosure. The vehicle 102 includes one or more processors 202, computer-readable storage media (CRM) 204, one or more communication components 220, and one or more vehicle-based systems 224. The vehicle 102 can also include one or more sensors (e.g., a camera, a radar system, a global positioning system (GPS), a global navigation satellite system (GNSS), a lidar system, an inertial measurement unit (IMU)) to provide input data to the localizer 104 and the vehicle-based systems 224.

The processor 202 can include, as non-limiting examples, a system on chip (SoC), an application processor (AP), an electronic control unit (ECU), a central processing unit (CPU), or a graphics processing unit (GPU). The processor 202 may be a single-core processor or a multiple-core processor implemented with a homogenous or heterogenous core structure. The processor 202 may include a hardware-based processor implemented as hardware-based logic, circuitry, processing cores, or the like. In some aspects, functionalities of the processor 202 and other components of the localizer 104 are provided via integrated processing, communication, or control systems (e.g., an SoC), which may enable various operations of the vehicle 102 in which the system is embodied.

The CRM 204 described herein excludes propagating signals. The CRM 204 may include any suitable memory or storage device such as random-access memory (RAM), static RAM (SRAM), dynamic RAM (DRAM), non-volatile RAM (NVRAM), read-only memory (ROM), or Flash memory useable to store device data (not illustrated), map data 208, position data 210, and vision data 212 of a data manager 206.

The processor 202 executes computer-executable instructions stored within the CRM 204 to perform the techniques described herein. For example, the processor 202 can execute the data manager 206 to process and access the position data 210 or cause the localizer 104 to perform vehicle localization using the map data 208 and the vision data 212.

The data manager 206 includes the map data 208, the position data 210, and the vision data 212. The data manager 206 can store the map data 208, process updated map data received from a remote source, and retrieve portions of the map data 208 for the localizer 104. In the depicted system, the data manager 206 is illustrated as located on or within the vehicle 102. In other implementations, the data manager 206 or another implementation of the data manager 206 can be located remote from vehicle 102 (e.g., in the cloud or on a remote computer system) and provide the map data 208 or a subset of the map data 208 to the vehicle 102 and the localizer 104.

The map data 208 can include lane geometry data, including the map centerline points 108, the lane segments 110, and the LSGs 112. For example, the map data 208 can include lane geometry data for a predetermined proximity around a current position or pose of the vehicle 102 or along a navigation route. Lane geometry data for each lane of the environment 100 can include an array of points for a lateral (e.g., x) and longitudinal (e.g., y) position of the map centerline points 108 in a global or map coordinate system and an offset for the distance traveled by the vehicle 102 in a particular lane segment 110 and/or LSG 112. The lane geometry data can also include other details associated with roadways (e.g., curvature, traffic control devices, stop bars, localization data, and three-dimensional data). The map data 208 can be stored locally or received from a remote source or database that provides lane geometry data for sections of the roadways.

The position data 210 provides a pose or position with a lateral (e.g., x) and longitudinal (e.g., y) position in a global or map coordinate system and a heading of the vehicle 102. The position data 210 can be generated from sensor data from satellite systems (e.g., GPS, GNSS) and/or motion sensors (e.g., IMUs).

The vision data 212 can include the vision centerline points 106 and be generated from sensor data of vision sensors (e.g., cameras). The data manager 206 can determine a lateral offset of the vehicle 102 relative to a center of the lane based on the left and right lane lines detected from the vision data 212. The lateral offset can provide a lateral (e.g., x) and longitudinal (e.g., y) distance of the vehicle 102 from a vision centerline point 106, which can be set at a longitudinal distance ahead of the vehicle 102 based on its current speed. The vision centerline point 106 can be obtained in the map coordinate system. The data manager 206 can also apply different logic or algorithms to determine the center line when both lane lines are not visible (e.g., at lane mergers).

Similarly, the processor 202 can execute the localizer 104 to accurately localize the vehicle 102. The localizer 104 can include a position module 214, a lane crawler 216, and a fusion module 218. The position module 214 can apply a position model to the position data 210 to maintain an estimated pose of the vehicle 102 when satellite system data is intermittent. The position module 214 can be designed to avoid step-function changes in the estimated pose or heading of the vehicle 102, which can negatively impact the vehicle-based system 224. The position module 214 can provide the pose and heading to the lane crawler 216.

The lane crawler 216 determines the location of the vehicle 102 on or within the map data 208 based on the estimated pose or heading provided by the position module 214. The lane crawler 216 can output a lateral offset of the vehicle 102 to the centerline for the current lane of travel. The lateral offset can be determined as a longitudinal distance ahead of the vehicle based on its speed to match that of the data manager 206 for processing the vision data 212.

The fusion module 218 can compare a trail or series of the vision centerline points 106 to a series or trail of the map centerline points 108 to determine a fused trail. The vision centerline points 106 and the map centerline points 108 are initially in the map coordinate system. The data manager 206 or the fusion module 218 can transform the trail points from map coordinates into a vehicle coordinate system. The fused trail is obtained by using a transformation to best fit (e.g., a least error fit) a match between the two trails, resulting in a corrected pose to localize the vehicle 102. The corrected pose includes a lateral correction, a longitudinal correction, and/or a heading or rotation correction. The lateral correction can represent a value in the vehicle coordinate system to adjust the pose of the vehicle 102 in a lateral direction (e.g., along the x-axis of the vehicle coordinate system). The longitudinal correction can represent a value in the vehicle coordinate system to adjust the pose of the vehicle 102 in a longitudinal direction (e.g., along the y-axis of the vehicle coordinate system). The rotation correction can represent a value in radians (or degrees) to correct the heading of the vehicle 102. The resulting lateral correction, longitudinal correction, and rotation correction are transformed into the map coordinate system to apply them to the current vehicle pose estimate and determine the corrected pose.

The fusion module 218 can apply several rules to maintain a stable fused trail. The vision centerline points 106 and the map centerline points 108 are generally sampled on a periodic distance of travel (e.g., every six meters). The vision centerline points 106 and the map centerline points 108 include synchronized samples of the lateral offset of the centerline relative to the estimated pose of the vehicle 102. Trail points are skipped or not sampled for conditions where either the vision centerline points 106 or the map centerline points 108 are invalid (e.g., during a lane change where the centerline switches to the new lane). The fusion module 218 can also set a minimum valid trail length for determining a corrected pose. In addition, the fusion module 218 can allow a configurable gap of trail samples to maintain corrections during transient events (e.g., lane changes, lane mergers).

The communication components 220 can include a vehicle-based system interface 222. The vehicle-based system interface 222 can transmit data over a communication network of the vehicle 102 between various components of the vehicle 102 or between components of the vehicle 102 and external components. For example, when the data manager 206 and the localizer 104 are integrated within the vehicle 102, the vehicle-based system interface 222 may facilitate data transfer therebetween. When a portion of the data manager 206 is remote to the vehicle 102, the vehicle-based system interface 222 may facilitate data transfer between the vehicle 102 and a remote entity that has the data manager 206. The communication components 220 can also include a sensor interface (not illustrated) to relay measurement data from sensors as input to the data manager 206, the vehicle-based systems 224, or other components of the vehicle 102.

The vehicle-based system interface 222 can transmit the corrected pose to the vehicle-based systems 224 or another component of the vehicle 102. In general, the corrected pose and corrected heading provided by the vehicle-based system interface 222 is in a format usable by the vehicle-based systems 224.

The vehicle-based systems 224 can use the corrected pose and corrected heading data from the localizer 104 to operate the vehicle 102 on the roadway. The vehicle-based systems 224 can include an assisted-driving system and an autonomous-driving system (e.g., a Traffic-Jam Assist (TJA) system, Lane-Centering Assist (LCA) system, L3/L4 Autonomous Driving on Highways (L3/L4) system). Generally, the vehicle-based systems 224 require accurate localization data (e.g., an accuracy of plus or minus ten centimeters) to satisfy performance requirements. As described in greater detail below, the localizer 104 expands the instances in which sufficiently accurate localization data is provided to the vehicle-based systems 224. The localizer 104 uses the vision detection of lane lines to correct the position data 210 by efficiently using a trail of fused data points. In this way, the localizer 104 can handle lane changes, tight curves in a roadway, and poor satellite reception.

The vehicle-based systems 224 may move the vehicle 102 to a particular location on the roadway while operating the vehicle 102 based on the corrected pose provided by the localizer 104. The autonomous-driving system can also move the vehicle 102 to a specific location on the roadway to avoid collisions with objects detected by other systems (e.g., a radar system, a lidar system) on the vehicle 102 and move the vehicle 102 back to the original navigation route.

Trail Generation

Figure 3:
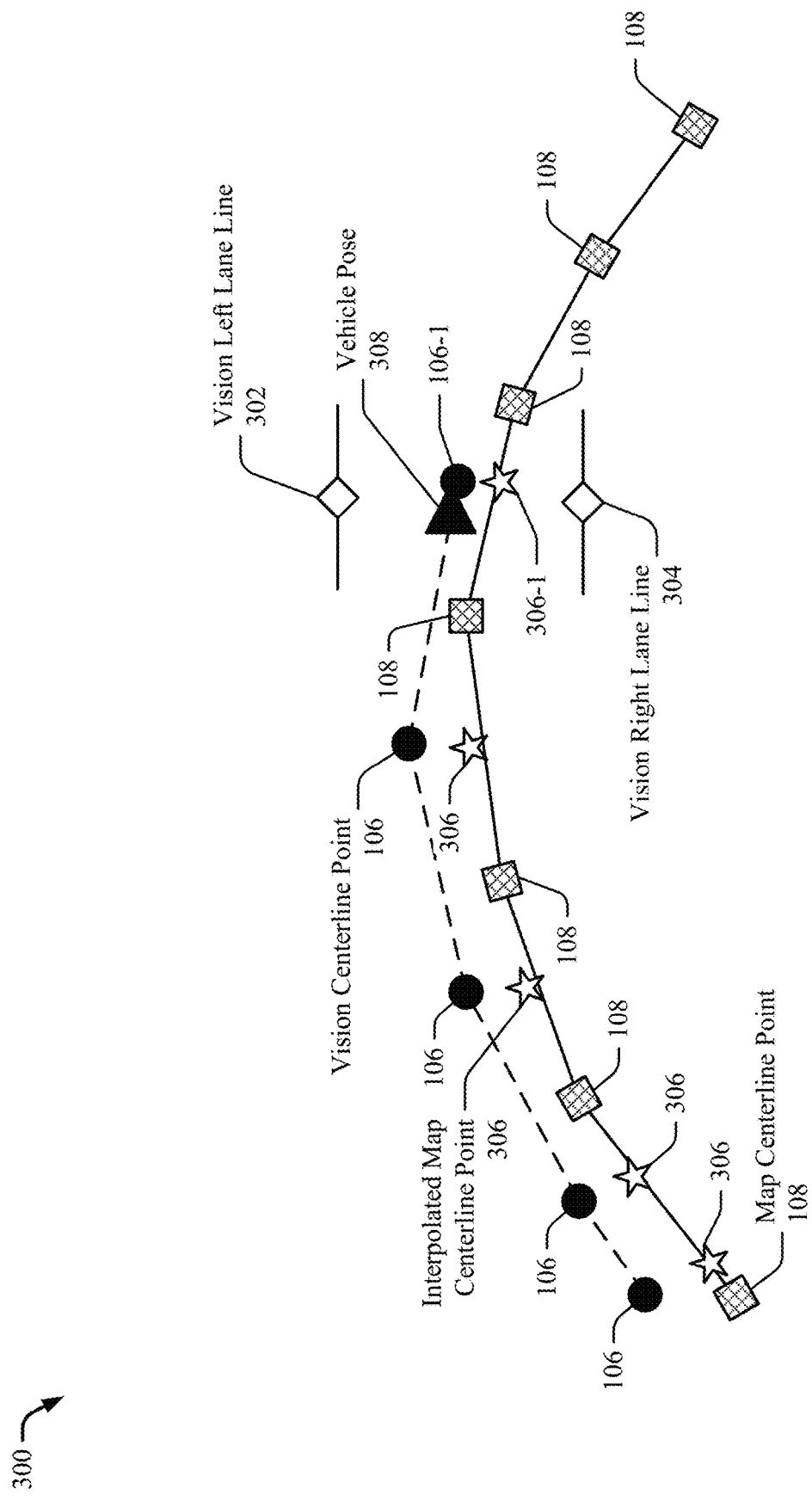
FIG. 3 illustrates an example conceptual diagram indicating how vision centerline points and map centerline points are managed as inputs to vehicle localization.

FIG. 3 illustrates an example conceptual diagram 300 indicating how vision centerline points 106 and map centerline points 108 are managed as inputs to vehicle localization. The localizer 104 obtains and manages the vision centerline points 106 and the map centerline points 108 to generate a vehicle trail.

As the vehicle 102 is traveling along a roadway, the localizer 104 obtains a vision left lane line 302 and a vision right lane line 304. The vision left lane line 302 and the vision right lane line 304 indicate the current lateral offset of the left lane line and the right lane line, respectively, from a vehicle pose 308. The lateral offsets are provided as a vehicle-coordinate-system value. The localizer 104 can set the lateral offsets relative to the vehicle pose 308 based on vehicle speed and steering angle.

The vehicle pose 308 represents an estimated position of the vehicle 102 in the map coordinate system based on the position data 210. As described above, the position data 210 can be obtained from GPS sensors, GNSS sensors, IMU sensors, or wheel encoder systems. The vehicle pose 308 also includes a heading (e.g., in radians) to allow transforming points between the map coordinate system and the vehicle coordinate system.

The localizer 104 uses a vision centerline point 106-1, which represents the vision centerline point 106 for the current vehicle pose, to determine a vision centerline lateral offset from the vehicle pose. The vision centerline lateral offset is translated to the map coordinate system to determine a longitudinal (e.g., x) and lateral (e.g., y) coordinate to be sampled for addition to the vehicle trail. Because the localizer 104 does not focus on processing lane lines in front of the vehicle 102, the described vehicle localization is robust to errors in vision processing lane line trajectories.

The localizer 104 maintains the vision centerline points 106 as vision trail points. The vision centerline points 106 are generated from the vision centerline lateral offset. The vision trail points are maintained in the map coordinate system and generally evenly spaced based on the distance traveled by the vehicle 102. For example, the vision centerline points 106 can be sampled based on the vehicle 102 traveling a specified distance as opposed to at a particular clock interval.

The localizer 104 also maintains the map centerline points 108 as map trail points. The map centerline points 108 are sparsely spaced in the map coordinate system with their density generally inversely proportional to the curvature of the roadway. The localizer 104 determines interpolated map centerline points 306 from the map centerline points 108. In contrast to the map centerline points 108, the interpolated map centerline points 306 are generally evenly spaced in the map coordinate system and paired with a corresponding vision centerline point 106.

The localizer 104 uses an interpolated map centerline point 306-1, which represents the interpolated map centerline point 306 for the current vehicle pose 308, to determine a map centerline lateral offset from the vehicle pose. The longitudinal position of the interpolated map centerline point 306-1 is determined to correspond to the longitudinal position of the vision centerline point 106-1. The lateral position of the interpolated map centerline point 306-1 is determined by interpolating between the two nearest map centerline points 108. The map centerline lateral offset is in or translated to the map coordinate system and paired with the associated vision centerline point 106-1.

The localizer 104 maintains the paired vision centerline points 106 and interpolated map centerline points 306 as the vehicle trail. In this way, the localizer 104 uses a single trail of sampled centerline points from map data and vision data to localize the vehicle. As the vehicle 102 travels along a roadway, the vehicle trail points accumulate. The localizer 104 can analyze the length of and gaps in the vehicle trail to determine whether the vehicle trail is valid for determining a corrected vehicle position. The localizer 104 can determine if the length of the vehicle trail is less than a length threshold. The length threshold can be a configurable distance. For example, the length threshold can be dynamically adjusted based on vehicle speed and roadway curvature to enable shorter trails on roadway sections with curves and longer trails on straight roadway sections. The localizer 104 can consider a vehicle trail shorter than the length threshold as invalid for position correction and can wait to apply a lateral or longitudinal correction until the vehicle trail is valid. If the vehicle trail is longer than the length threshold, then the vehicle trail is sufficient to enable the corrected position determination.

The localizer 104 can also maintain a list of filtered vehicle trail points, which indicate when a trail point is skipped based on filtering criteria. Trail points can be filtered when there are transients in the vision centerline points 106 (e.g., during a lane change). The localizer 104 can identify the vehicle trail as invalid if a gap in the vehicle trail exceeds a gap threshold and can wait to apply a lateral or longitudinal correction until the vehicle trail is valid. The vehicle trail can exceed the gap threshold due to persistent issue causing trail points to be filtered out (e.g., temporary loss or blocking of lane line markers).

Pose Correction

Figure 4:
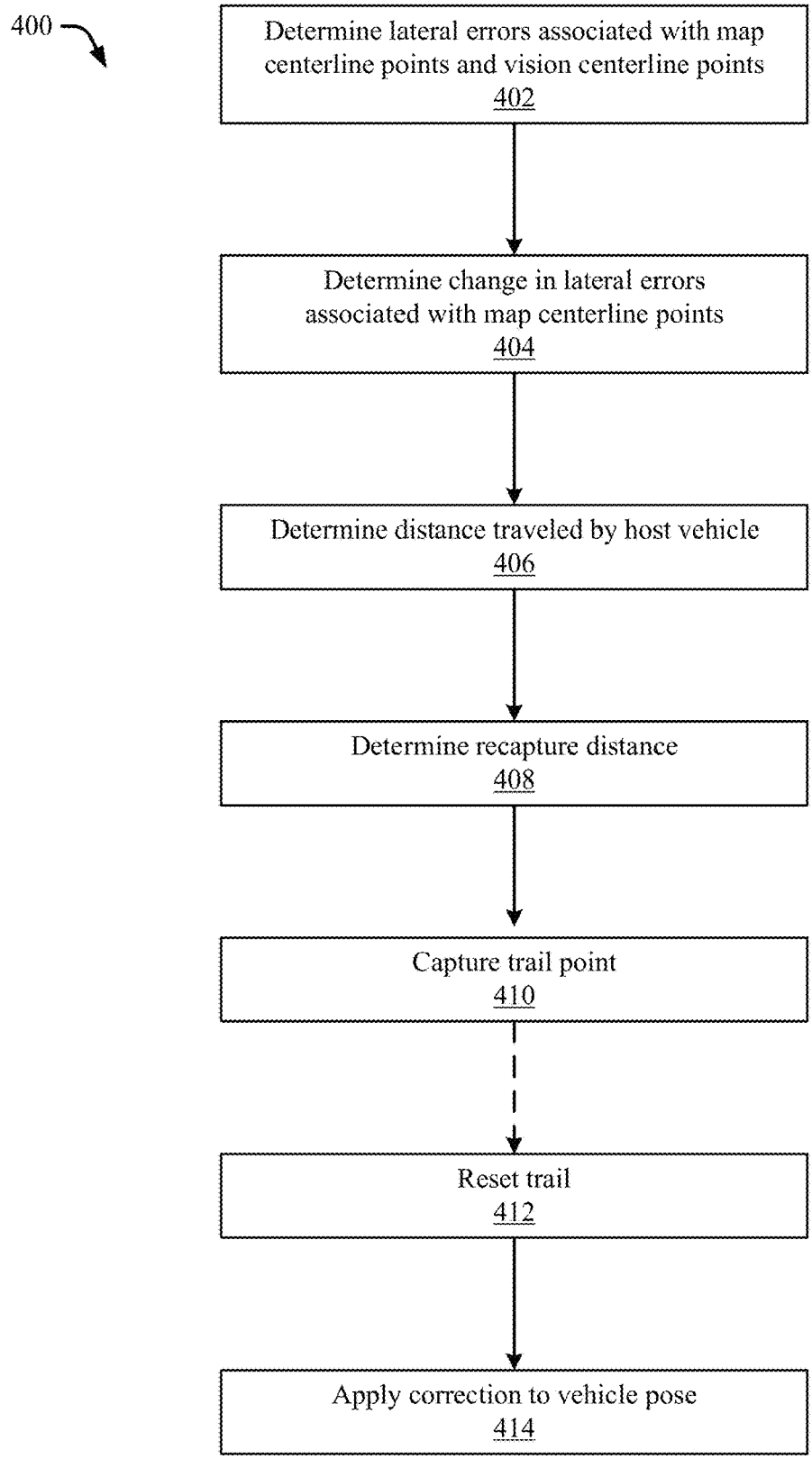
FIG. 4 illustrates an example conceptual diagram of a software method to localize a vehicle using map and vision data according to techniques described in this disclosure.

FIG. 4 illustrates an example conceptual diagram 400 of a software method to localize a vehicle using map and vision data according to techniques described in this disclosure. In particular, the conceptual diagram 400 illustrates a software method to manage trail points and apply pose or position corrections. The localizer 104 of FIGS. 1 and 2 or another component can perform the software method illustrated in the conceptual diagram 400.

The localizer 104 can perform the software method at a cyclic rate to determine a pose correction and localize the vehicle 102. For example, the localizer 104 can have a cycle time for the conceptual diagram 400 of no more than twenty milliseconds to process the map data 208, the position data 210, and the vision data 212.

At 402, the localizer 104 determines lateral errors and longitudinal errors associated with map centerline points 108 and vision centerline points 106. The localizer 104 can determine the lateral errors relative to the vehicle pose 308. The lateral errors can be in units of meters. In performing the software method, the localizer 104 determines a pose correction that minimizes the lateral and longitudinal errors between the map data 208 and the vision data 212. The localizer 104 maintains the trail of vision centerline points 106 and the trail of map centerline points 108 and interpolated map centerline points 306 to infer the shape of the roadway and minimize both the lateral and longitudinal errors. The localizer 104 can use an Nth order polynomial equation to represent the centerline of a road segment starting from the vehicle pose 308, with the lateral error representing the first coefficient or offset from the vehicle pose 308.

At 404, the localizer 104 determines a change or derivative in the lateral errors and longitudinal errors associated with the map centerline points 108. In particular, the localizer 104 determines the change in the map vision error between the current and previous values. This change value is used to detect transient conditions where a significant deviation between the map and vision centerlines exist. The localizer 104 primarily uses the change value to detect lane changes where the vision centerline lateral offset changes sign (e.g., from negative to positive).

At 406, the localizer 104 determines the distance traveled by the vehicle 102. The localizer 104 determines the distance traveled since the last sampling of map and vision lateral offsets to generate a trail point. The distance traveled can be based on the Euclidean distance between the current estimated vehicle pose 308 (e.g., from the position data 210) and the corrected vehicle pose for the most recent trail point.

At 408, the localizer 104 determines a recapture distance based on a configurable distance between trail points (e.g., six meters when traveling at a speed of 75 miles per hour). The configurable distance can be extended to allow skipping trail points under transient conditions (e.g., lane changes). Operation 408 is described in greater detail with respect to FIG. 5.

At 410, the localizer 104 captures a trail point when the vehicle 102 travels a distance greater than the recapture distance. Operation 410 to create a trail point is described in greater detail with respect to FIGS. 6 and 7.

At 412, the localizer 104 can reset the trail under specific conditions where sensor data is invalid or significant transients occur. In such situations, the trail can be considered invalid and reset.

At 414, the localizer 104 applies a correction to the vehicle pose 308. When the trail is valid for both length and gaps, the localizer 104 applies the pose correction to the vehicle pose 308 to generate the corrected vehicle pose. In this way, the localizer 104 can use the map data 208 and the vision data 212 to generate a map trail and a vision trail and localize the vehicle 102.

Figure 5:
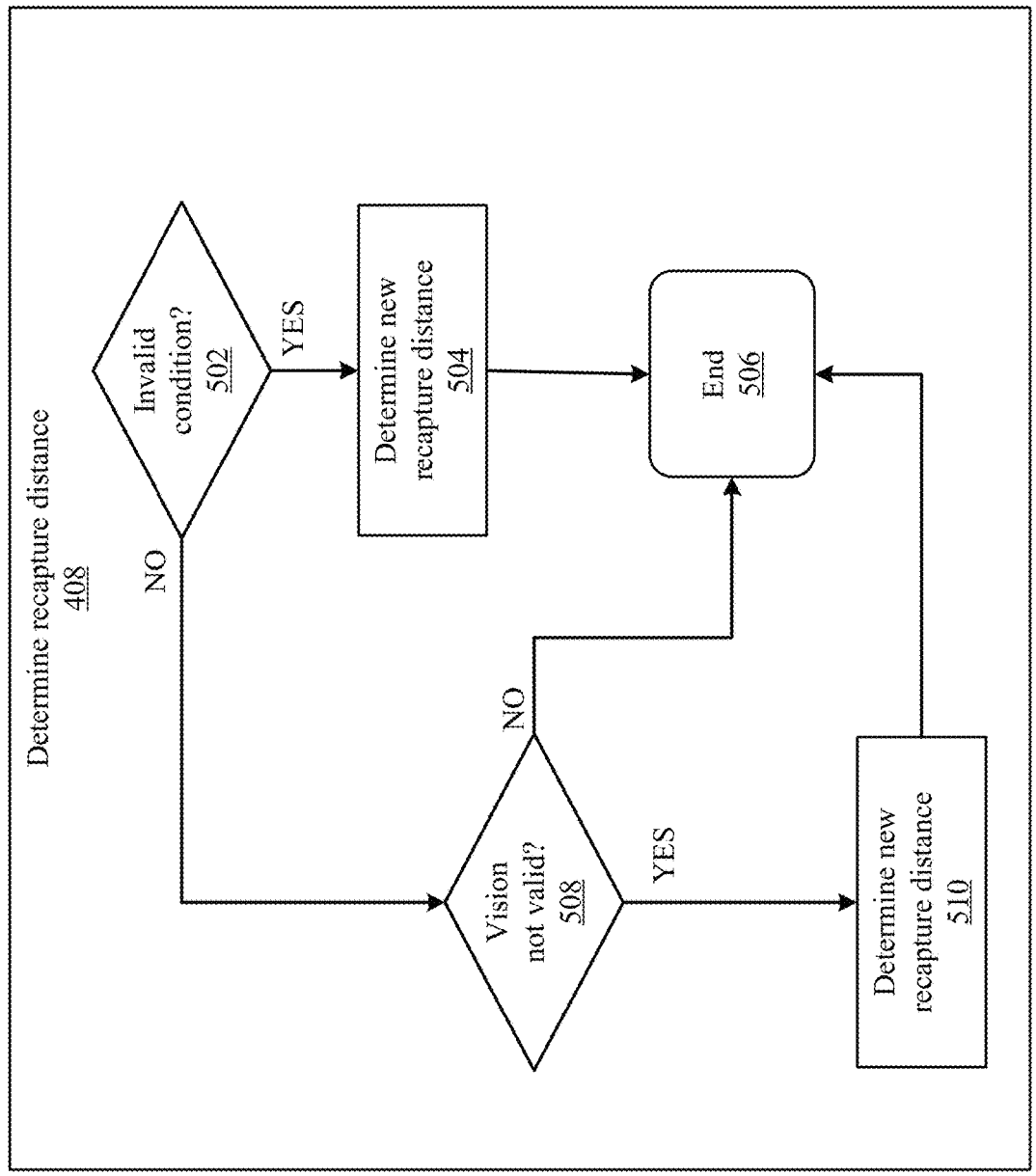
FIG. 5 illustrates an example conceptual diagram of a software method to determine a recapture distance as part of vehicle localization using map and vision data.

FIG. 5 illustrates an example conceptual diagram 500 of a software method to determine a recapture distance as part of vehicle localization using map and vision data. In particular, the conceptual diagram 500 illustrates a software method to perform operation 408 (e.g., determine recapture distance) of FIG. 4. The localizer 104 of FIGS. 1 and 2 or another component can perform the software method illustrated in the conceptual diagram 500.

At 502, the localizer 104 determines whether the lateral errors or the change in lateral errors (e.g., from operations 402 and 404 of FIG. 4) exceeds a configurable threshold. If the lateral errors or the change in lateral errors exceed the configurable threshold, then the conditions are not valid for capturing a trail point during the transient condition (e.g., during a lane change).

At 504, if an invalid condition exists, the localizer 104 determines a new recapture distance by adding a configurable transient gap distance (e.g., in meters) to the current distance traveled by the vehicle 102.

At 506, the localizer 104 ends the software method to determine the recapture distance and returns to the software method described with respect to FIG. 4.

At 508, if an invalid condition does not exist, the localizer 104 determines whether the vision data 212 is valid or sufficient for determining the vision centerline point 106 based on both the left lane line and the right lane line. If the vision data 212 is valid, the localizer 104 proceeds to operation 506 and ends the software method to determine the recapture distance.

At 510, if the vision data 212 is not valid, the localizer 104 determines a new recapture distance by adding a configurable vision gap distance (e.g., in meters) to the current distance traveled by the vehicle 102.

Figure 6:
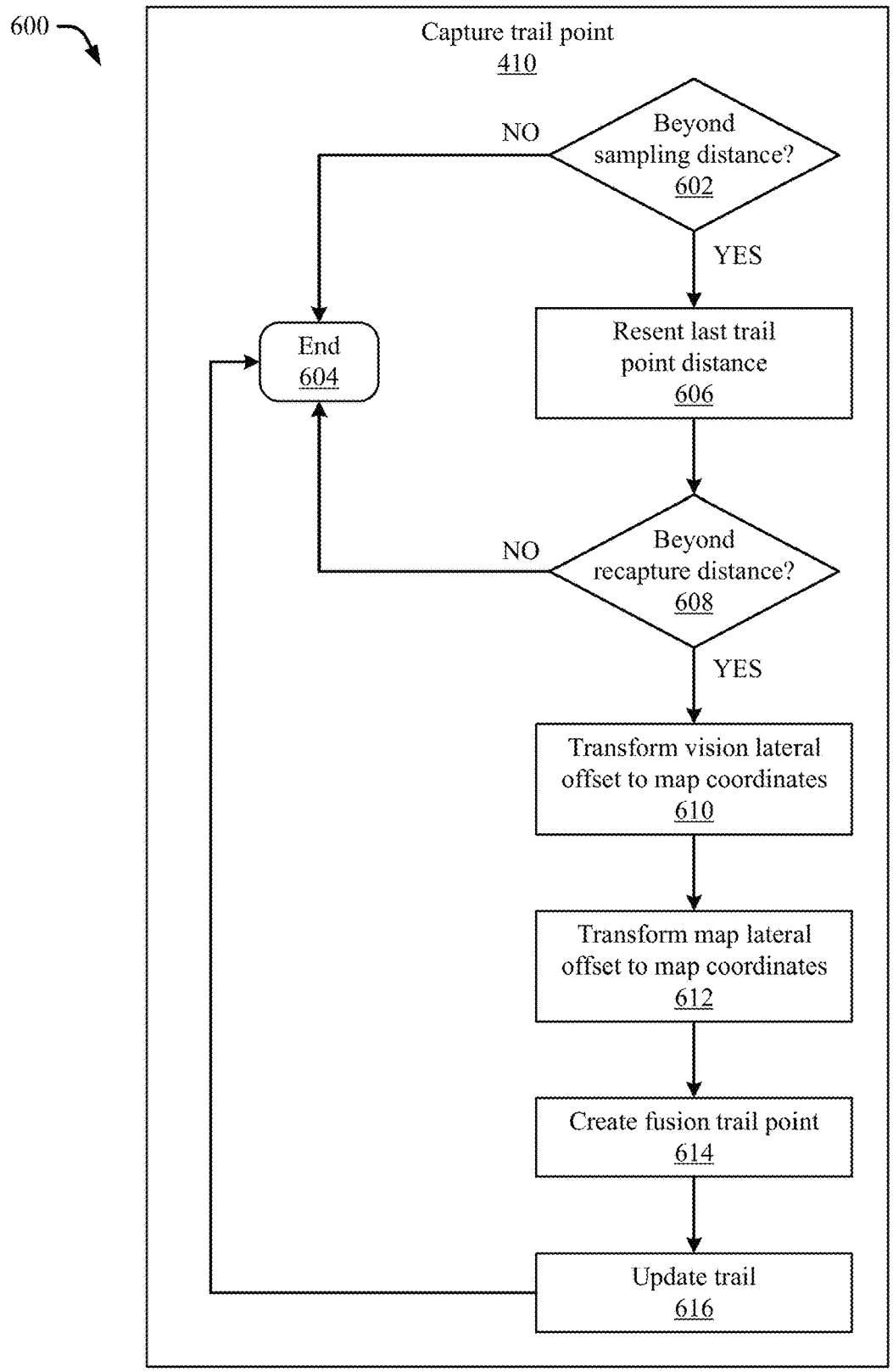
FIG. 6 illustrates an example conceptual diagram of a software method to capture a trail point as part of vehicle localization using map and vision data.

FIG. 6 illustrates an example conceptual diagram 600 of a software method to capture a trail point as part of vehicle localization using map and vision data. In particular, the conceptual diagram 600 illustrates a software method to perform operation 410 (e.g., capture trail point) of FIG. 4. The localizer 104 of FIGS. 1 and 2 or another component can perform the software method illustrated in the conceptual diagram 600.

At 602, the localizer 104 determines whether the vehicle 102 has traveled beyond the sampling distance (e.g., six meters for highway speeds) since the most-recent trail point. If so, the data at this vehicle pose is a candidate for recording as a trail point.

At 604, if the vehicle 102 has not traveled past the sampling distance, the localizer 104 ends the software method to capture the trail point and returns to the software method described with respect to FIG. 4. At 606, if the vehicle 102 has traveled past the sampling distance, the localizer 104 resets the last trail point distance to allow for the next sample.

At 608, the localizer 104 determines whether the vehicle 102 has traveled past the recapture distance. The localizer 104 can set the recapture distance as the last distance traveled by default. If transient or error conditions exist, the localizer 104 can adjust the recapture distance. If the vehicle 102 has not traveled past the recapture distance, the localizer 104 proceeds to operation 604 and ends the software method to capture the trail point.

If the vehicle 102 has traveled past the recapture distance, the localizer 104 samples the data and creates a trail point. At 610, the localizer 104 transforms the vision lateral offset to map coordinates. The vision lateral offset is generally in the vehicle coordinate system (e.g., relative to the vehicle 102) and the localizer 104 translates and rotates it into the map coordinate system.

At 612, the localizer 104 transforms the map lateral offset to map coordinates. The map lateral offset represents the offset of the vehicle 102 from the centerline interpolated between map centerline points 108. The localizer 104 translates and rotates the map lateral offset into the map coordinate system.

At 614, the localizer 104 creates a fusion trail point that stores the vision lateral offset and map lateral offset in map coordinates. The distance traveled is also stored to support determining distances and managing the trail length. Each fusion trail point is added to a queue to maintain the fused trail in memory.

At 616, the localizer 104 updates the fused trail by managing the trail length and determining a match between the map and vision data. The operation 616 to update the trail is described in greater detail with respect to FIG. 7.

Figure 7:
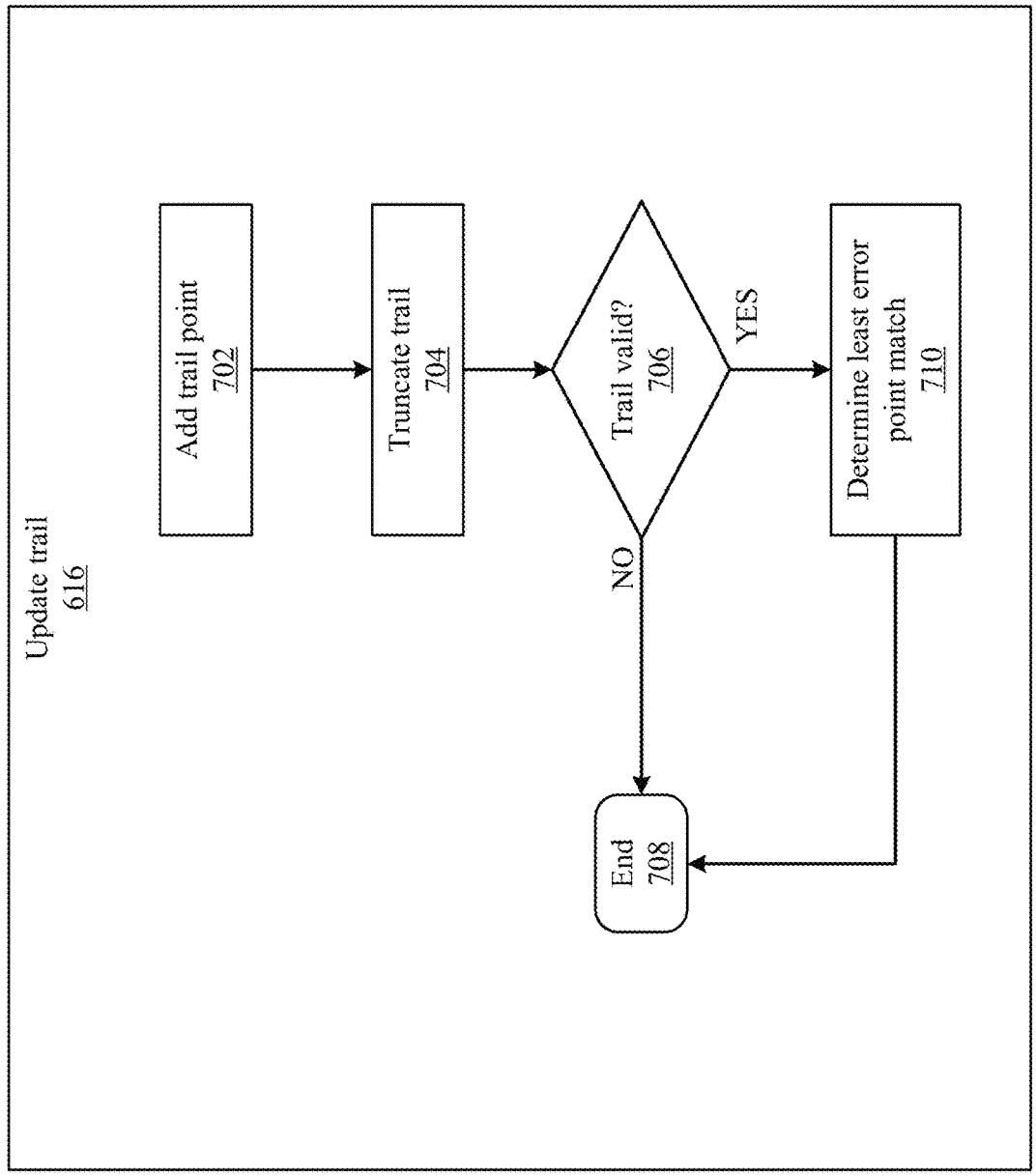
FIG. 7 illustrates an example conceptual diagram of a software method to update the trail as part of vehicle localization using map and vision data.

FIG. 7 illustrates an example conceptual diagram 700 of a software method to update the trail as part of vehicle localization using map and vision data. In particular, the conceptual diagram 700 illustrates a software method to perform operation 616 (e.g., update trail) of FIG. 6. The localizer 104 of FIGS. 1 and 2 or another component can perform the software method illustrated in the conceptual diagram 700.

At 702, the localizer 104 adds the trail point from the fusion data to the end of the vector or array of trail points.

At 704, the localizer 104 truncates the trail. When the distance of the oldest trail point (e.g., the first trail point in the vector or array of trail points) is beyond the configurable trail distance, then the localizer 104 removes the oldest trail point from the vector or array of trail points.

At 706, the localizer 104 determines whether the trail is valid. In particular, the localizer 104 determines whether the trail length is longer than a configurable value and the gap between the two most recent trail points is less than another configurable value. If both conditions are satisfied, the trail is considered valid.

At 708, if the localizer 104 determines that the trail is not valid, the localizer 104 ends the software method to update the trail and returns to the software method described with respect to FIG. 6.

At 710, if the localizer 104 determines that the trail is valid, the localizer 104 determines a least error point match between the most recent vision centerline point 106 and the map centerline point 108. The localizer 104 compares the vision centerline point 106 to the map centerline point 108 to determine a transformation to minimize the error between the map data and vision data.

Example Method

Figure 8:
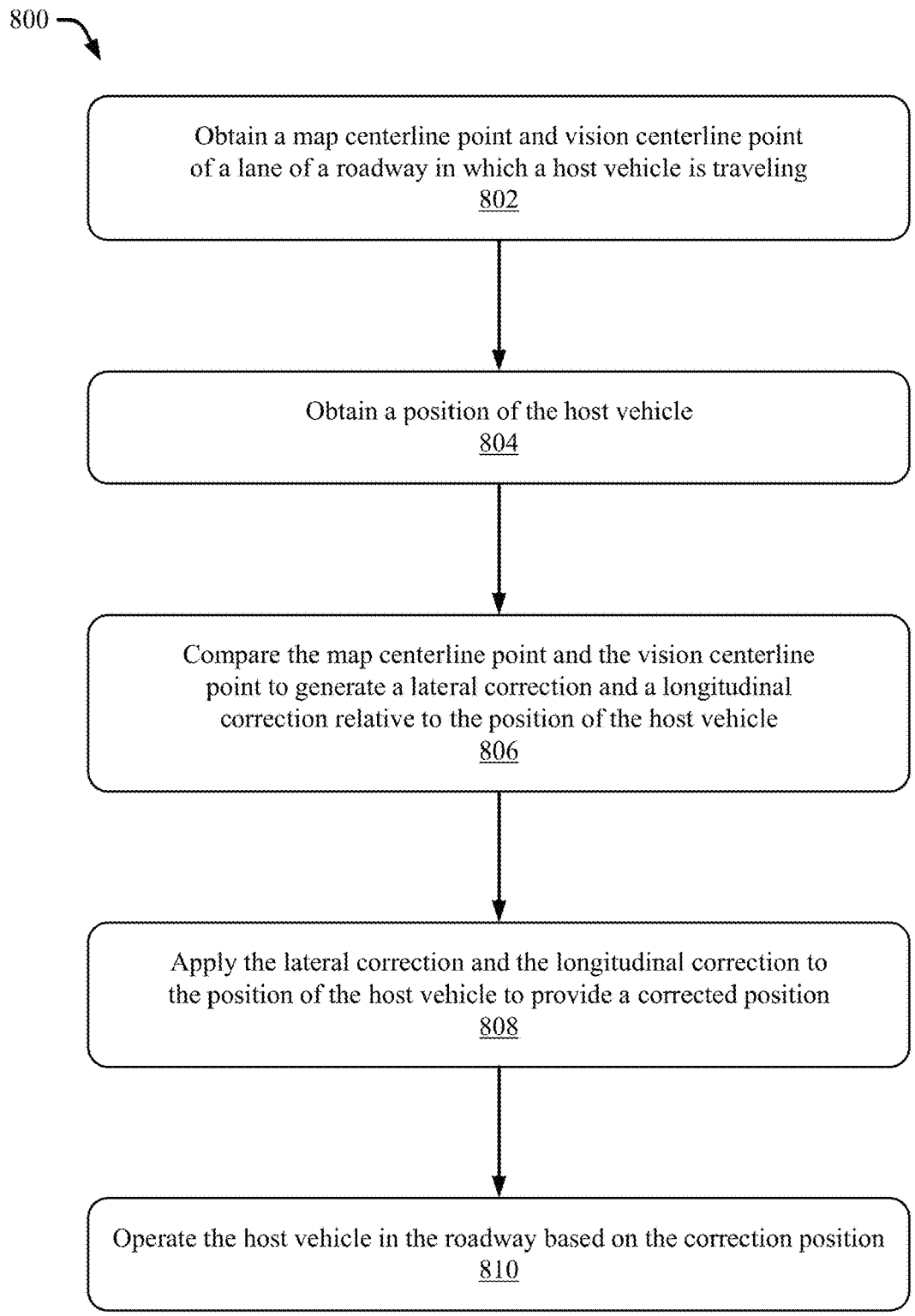
FIG. 8 illustrates an example flowchart as an example process to perform vehicle localization using map and vision data.

FIG. 8 illustrates an example flowchart as an example process to perform vehicle localization using map and vision data. Flowchart 800 is shown as sets of operations (or acts) performed, but not necessarily limited to the order or combinations in which the operations are shown herein. Further, one or more of the operations may be repeated, combined, or reorganized to provide other methods. In portions of the following discussion, reference may be made to localizer 104 of FIGS. 1 through 7 and entities detailed therein, references to which are made for example only. The techniques are not limited to performance by one entity or multiple entities.

At 802, a map centerline point and vision centerline point of a lane of a roadway in which a host vehicle is traveling are obtained. For example, the localizer 104 can obtain a vision centerline point 106 and a map centerline point 108 for the vehicle 102. The vision centerline point 106 can be obtained from the vision data 212 of a vision-based system of the vehicle 102. The map centerline point 108 can be obtained from a map database that includes the map data 208. The vision centerline point and the map centerline point 108 can be obtained in a map coordinate system.

The localizer 104 can obtain the vision centerline point 106 by determining, using the vision data 212, a left lane line and a right lane line of the lane of the roadway. The vision centerline point 106 can then be determined as a lateral centerline point between the left lane line and the right lane line.

The localizer 104 can obtain the map centerline point 108 by determining, using the map data 208 in the map database, two nearest database centerline points for the lane to the vehicle's position. The localizer 104 can interpolate the two nearest database centerline points to obtain the map centerline point 108. The map centerline point 108 has a longitudinal position along the roadway approximately equal to the longitudinal position of the vision centerline point 106.

At 804, a position of the host vehicle can be obtained. For example, the localizer 104 can obtain a position of the vehicle 102 using the position data 210. The position data 210 can be obtained from at least one of a Global Positioning System (GPS), a Global Navigation Satellite System (GNSS), or an inertial measurement unit (IMU). The vehicle's position can be obtained in the map coordinate system. The localizer 104 can also use the position data 210 to obtain the vehicle's heading.

The localizer 104 can transform the map centerline point 108 and the vision centerline point 106 from the map coordinate system to a vehicle coordinate system. The vehicle coordinate system is relative to the vehicle's position and heading.

At 806, a comparison of the map centerline point and the vision centerline point can be performed to generate a lateral correction and longitudinal correction relative to the position of the host vehicle. For example, the localizer 104 can compare the map centerline point 108 and the vision centerline point 106 to generate a lateral correction and a longitudinal correction relative to the position of the vehicle 102. The localizer 104 can match the map centerline point 108 and the vision centerline point 106 by applying a least-squares fitting algorithm to the map centerline point 108 and the vision centerline point 106.

The lateral correction and longitudinal correction can be obtained in a vehicle coordinate system. The localizer can transform the lateral correction and the longitudinal correction to the map coordinate system. The localizer 104 can also generate, based on the map between the map centerline point 108 and the vision centerline point 106, a heading correction for the vehicle 102.

At 808, the lateral correction and the longitudinal correction can be applied to the position of the host vehicle to provide a corrected position of the host vehicle. For example, the localizer 104 can apply (e.g., add or subtract) the lateral correction and the longitudinal correction to the position of the vehicle 102 to generate a correction position. The localizer 104 can also apply the heading correction to the vehicle's heading to provide a corrected heading.

The localizer 104 can add the vision centerline point 106 to a vision trail. The vision trail does not include vision centerline points 106 longitudinally ahead of the vehicle 102 along the roadway. The localizer 104 can also add the map centerline point 108 to a map trail. The localizer 104 can maintain the map trail and the vision trail in the data manager 206 or another component.

At 810, the host vehicle can be operated in the roadway based on the corrected position. For example, the localizer 104 can provide the corrected position to a vehicle-based system 224 that uses the corrected position to localize and operate the vehicle 102 in the roadway.

Examples

In the following section, examples are provided.

Example 1. A method comprising: obtaining a map centerline point and a vision centerline point of a lane of a roadway in which a host vehicle is traveling, the map centerline point being obtained from a map database, the vision centerline point being obtained from vision data of a vision-based system; obtaining a position of the host vehicle; comparing the map centerline point and the vision centerline point to generate a lateral correction and a longitudinal correction relative to the position of the host vehicle; applying the lateral correction and the longitudinal correction to the position of the host vehicle to provide a corrected position of the host vehicle; and operating, based on the corrected position, the host vehicle in the roadway.

Example 2. The method of Example 1, wherein the map centerline point, the vision centerline point, and the position of the host vehicle are obtained in a map coordinate system.

Example 3. The method of Example 2, the method further comprising: transforming the map centerline point and the vision centerline point from the map coordinate system to a vehicle coordinate system, the vehicle coordinate system being relative to the position of the host vehicle and a heading of the host vehicle.

Example 4. The method of any preceding example, wherein obtaining the vision centerline point of the lane comprises: determining, using the vision data, a left lane line and a right lane line of the lane of the roadway; and determining the vision centerline point of the lane as a lateral centerline point between the left lane line and the right lane line.

Example 5. The method of any preceding example, wherein obtaining the map centerline point of the lane comprises: determining, using the map database, two nearest database centerline points for the lane to the position of the host vehicle; and interpolating the two nearest database centerline points to obtain the map centerline point, the map centerline point having a longitudinal position along the roadway approximately equal to the longitudinal position of the vision centerline point.

Example 6. The method of any preceding example, the method further comprising: adding the map centerline point to a map trail; adding the vision centerline point to a vision trail; and maintaining the map trail and the vision trail.

Example 7. The method of Example 6, wherein: the map trail and the vision trail are maintained as a vehicle trail; and the method further comprises: determining a length of the vehicle trail from the position of the host vehicle; determining whether one or more gaps in the vehicle trail are greater than a gap threshold value, respectively; and in response to the trail length being greater than a trail length threshold and the one or more gaps being less than the gap threshold value, identifying the vehicle trail as valid and applying the lateral correction and the longitudinal correction to the position of the host vehicle to provide the corrected position, the trail length threshold being adjusted based on at least one of a speed of the host vehicle or a curvature of the roadway; or in response to the trail length being less than the trail length threshold or the one or more gaps being greater than the gap threshold value, identifying the vehicle trail as invalid and waiting to apply the lateral correction and the longitudinal correction until the vehicle trail is valid.

Example 8. The method of Example 6, wherein the vision trail does not include vision centerline points that are located longitudinally ahead of the host vehicle along the roadway.

Example 9. The method of any preceding example, wherein the position of the host vehicle is obtained from at least one of a Global Positioning System (GPS), a Global Navigation Satellite System (GNSS), or an inertial measurement unit (IMU).

Example 10. The method of any preceding example, the method further comprising: obtaining a heading of the host vehicle; generating, based on the comparison of the map centerline point and the vision centerline point, a heading correction for the host vehicle; and applying the heading correction to the heading of the host vehicle to provide a corrected heading of the host vehicle.

Example 11. The method of any preceding example, wherein comparing the map centerline point and the vision centerline point comprises applying a least-squares fitting algorithm to the map centerline point and the vision centerline point.

Example 12. The method of any preceding example, wherein the lateral correction and the longitudinal correction are obtained in a vehicle coordinate system and the method further comprises: transforming the lateral correction and the longitudinal correction to a map coordinate system.

Example 13. A computer-readable storage media comprising computer-executable instructions that, when executed, cause a processor in a host vehicle to perform the method of any preceding example.

Example 14. A system comprising a processor configured to perform the method of any one of Examples 1 through 12.

Conclusion

While various embodiments of the disclosure are described in the preceding description and shown in the drawings, it is to be understood that this disclosure is not limited to it but may be variously embodied to practice within the scope of the following claims. From the preceding description, it will be apparent that various changes may be made without departing from the spirit and scope of the disclosure as defined by the following claims.

What is claimed is:

1. A method comprising:
obtaining a map centerline point and a vision centerline point of a lane of a roadway in which a host vehicle is traveling, the map centerline point being obtained from a map database, the vision centerline point being obtained from vision data of a vision-based system;
obtaining a position of the host vehicle;
comparing the map centerline point and the vision centerline point to generate a lateral correction and a longitudinal correction relative to the position of the host vehicle;
applying the lateral correction and the longitudinal correction to the position of the host vehicle to provide a corrected position of the host vehicle; and
operating, based on the corrected position, the host vehicle in the roadway.

2. The method of claim 1, wherein the map centerline point, the vision centerline point, and the position of the host vehicle are obtained in a map coordinate system.

3. The method of claim 2, the method further comprising:
transforming the map centerline point and the vision centerline point from the map coordinate system to a vehicle coordinate system, the vehicle coordinate system being relative to the position of the host vehicle and a heading of the host vehicle.

4. The method of claim 1, wherein obtaining the vision centerline point of the lane comprises:
determining, using the vision data, a left lane line and a right lane line of the lane of the roadway; and
determining the vision centerline point of the lane as a lateral centerline point between the left lane line and the right lane line.

5. The method of claim 1, wherein obtaining the map centerline point of the lane comprises:
determining, using the map database, two nearest database centerline points for the lane to the position of the host vehicle; and
interpolating the two nearest database centerline points to obtain the map centerline point, the map centerline point having a longitudinal position along the roadway approximately equal to the longitudinal position of the vision centerline point.

6. The method of claim 1, the method further comprising:
adding the map centerline point to a map trail;
adding the vision centerline point to a vision trail; and
maintaining the map trail and the vision trail.

7. The method of claim 6, wherein:
the map trail and the vision trail are maintained as a vehicle trail; and
the method further comprises:
determining a length of the vehicle trail from the position of the host vehicle;
determining whether one or more gaps in the vehicle trail are greater than a gap threshold value, respectively; and
in response to the trail length being greater than a trail length threshold and the one or more gaps being less than the gap threshold value, identifying the vehicle trail as valid and applying the lateral correction and the longitudinal correction to the position of the host vehicle to provide the corrected position, the trail length threshold being adjusted based on at least one of a speed of the host vehicle or a curvature of the roadway; or
in response to the trail length being less than the trail length threshold or the one or more gaps being greater than the gap threshold value, identifying the vehicle trail as invalid and waiting to apply the lateral correction and the longitudinal correction until the vehicle trail is valid.

8. The method of claim 6, wherein the vision trail does not include vision centerline points that are located longitudinally ahead of the host vehicle along the roadway.

9. The method of claim 1, wherein the position of the host vehicle is obtained from at least one of a Global Positioning System (GPS), a Global Navigation Satellite System (GNSS), or an inertial measurement unit (IMU).

10. The method of claim 1, the method further comprising:
obtaining a heading of the host vehicle;
generating, based on the comparison of the map centerline point and the vision centerline point, a heading correction for the host vehicle; and
applying the heading correction to the heading of the host vehicle to provide a corrected heading of the host vehicle.

11. The method of claim 1, wherein comparing the map centerline point and the vision centerline point comprises applying a least-squares fitting algorithm to the map centerline point and the vision centerline point.

12. The method of claim 1, wherein the lateral correction and the longitudinal correction are obtained in a vehicle coordinate system and the method further comprises:
transforming the lateral correction and the longitudinal correction to a map coordinate system.

13. A computer-readable storage media comprising computer-executable instructions that, when executed, cause a processor in a host vehicle to:
obtain a map centerline point and a vision centerline point of a lane of a roadway in which the host vehicle is traveling, the map centerline point obtained from a map database, the vision centerline point obtained from vision data of a vision-based system;
obtain a position of the host vehicle;
compare the map centerline point and the vision centerline point to generate a lateral correction and a longitudinal correction relative to the position of the host vehicle;
apply the lateral correction and the longitudinal correction to the position of the host vehicle to provide a corrected position of the host vehicle; and
operate, based on the corrected position, the host vehicle in the roadway.

14. The computer-readable storage media of claim 13, wherein the map centerline point, the vision centerline point, and the position of the host vehicle are obtained in a map coordinate system.

15. The computer-readable storage media of claim 14, wherein the computer-readable storage media comprises computer-executable instructions that, when executed, further cause the processor in the host vehicle to:
transform the map centerline point and the vision centerline point from the map coordinate system to a vehicle coordinate system, the vehicle coordinate system being relative to the position of the host vehicle and a heading of the host vehicle.

16. The computer-readable storage media of claim 13, wherein the computer-readable storage media comprises computer-executable instructions that, when executed to obtain the map centerline point of the lane, cause the processor in the host vehicle to:
determine, using the map database, two nearest database centerline points to the position of the host vehicle; and
interpolate the two nearest database centerline points to obtain the map centerline point, the map centerline point having a longitudinal position along the roadway approximately equal to the longitudinal position of the vision centerline point.

17. The computer-readable storage media of claim 13, wherein the computer-readable storage media comprises computer-executable instructions that, when executed, further cause the processor in the host vehicle to:
add the map centerline point to a map trail;
add the vision centerline point to a vision trail; and
maintain the map trail and the vision trail.

18. The computer-readable storage media of claim 17, wherein the vision trail does not include vision centerline points that are longitudinally ahead of the host vehicle along the roadway.

19. The computer-readable storage media of claim 13, wherein the computer-readable storage media comprises computer-executable instructions that, when executed, further cause the processor in the host vehicle to:
obtain a heading of the host vehicle;
generate, based on the comparison of the map centerline point and the vision centerline point, a heading correction for the host vehicle; and apply the heading correction to the heading of the host vehicle to provide a corrected heading of the host vehicle.

20. A system comprising a processor configured to:

obtain a map centerline point and a vision centerline point of a lane of a roadway in which a host vehicle is traveling, the map centerline point obtained from a map database, the vision centerline point obtained from vision data of a vision-based system;

obtain a position of the host vehicle;

compare the map centerline point and the vision centerline point to generate a lateral correction and a longitudinal correction relative to the position of the host vehicle;

apply the lateral correction and the longitudinal correction to the position of the host vehicle to provide a corrected position of the host vehicle; and operate, based on the corrected position, the host vehicle in the roadway.

\* \* \* \* \*